United States Patent Office 2,831,852
Patented Apr. 22, 1958

2,831,852

WATER-SOLUBLE THERMOPLASTIC CELLULOSE ETHERS

Albert B. Savage, Midland, Mich., assignor to The Dow Chemical Company, Midland, Mich., a corporation of Delaware No Drawing. Application May 27, 1954
Serial No. 432,921

5 Claims. (Cl. 260—231)

This invention relates to new cellulose ethers which are soluble in water and which are also significantly thermoplastic.

It is well known that the alkyl ethers of cellulose exhibit varying solubility characteristics, according to the degree to which the cellulose has been etherified. Thus, in the case of methyl cellulose, the presence of much less than 1.5 methoxyl groups per $C_6$-unit is associated with products which are soluble only in aqueous alkali, while 1.5 to 2.4 methoxyl groups per $C_6$-unit identify a methyl cellulose which is soluble in water but not in organic solvents, and 2.5 to 3 methoxyl groups are found in a methyl cellulose which is not soluble in water or in aqueous alkali but is soluble in such solvents as 70:30 benzene:methanol mixture. The water-soluble and the alkali-soluble methyl celluloses are not thermoplastic, and the only thermoplastic methyl cellulose is one which is so fully etherified that it has no solubility in aqueous media. The same variations are found in the properties of ethyl cellulose, and the water-soluble forms of ethyl cellulose are not thermoplastic, while the thermoplastic forms are not water-soluble. It is true, as well, that the water-soluble forms of other cellulose ethers, including carboxymethyl cellulose and hydroxyethyl and hydroxypropyl cellulose, are not thermoplastic.

There are fields of use for which water-soluble cellulose ethers would appear to be well suited because of their water-solubility, but in which they have found limited application because of their lack of thermoplasticity. One such is the manufacture of rigid or semi-rigid capsules for medicinals. So long as these must be made from aqueous solutions of the cellulose ether, no great advantage is seen by the manufacturer over the corresponding practice of making rigid capsules from aqueous dispersions of gelatine. If, however, a non-toxic, water-soluble cellulose ether were sufficiently thermoplastic to be formed by injection molding, or by extrusion and pressing, or other heat fabrication procedures, a marked economy could be effected, and a more uniform product obtained. In the rigid capsule field, it is considered undesirable to have more than minor amounts of a humectant in the capsule composition, and the large amounts of plasticizers which are required to render a normally non-thermoplastic water-soluble cellulose ether responsive to heat and pressure must be avoided. Hence, the desired product should be thermoplastic without the aid of plasticizers.

It is the principal object of this invention to provide a thermoplastic, water-soluble cellulose ether, and a method of making it. A specific object is to provide a water-soluble thermoplastic hydroxypropyl methyl cellulose. Other objects may appear hereinafter.

The water-soluble thermoplastic cellulose ether of the invention is a hydroxyethyl or a hydroxypropyl methyl cellulose having particular and novel proportions of hydroxyethyl or hydroxypropoxyl and of methoxyl groups in its molecule, as will be described. Specifically, the preferred new product is a cellulose ether having from 10 to 14 percent by weight of hydroxypropoxyl groups and from 25 to 30 percent by weight of methoxyl groups, i. e., it is one in which the ratio of O—H bonds to C—H bonds, as determined by infrared absorption spectra, is from 0.88 to 1.05. Such hydroxypropyl methyl celluloses are both thermoplastic and water-soluble, and they are readily distinguished from the previously known hydroxypropyl methyl celluloses which are water-soluble but non-thermoplastic, as the latter have from 7 to 9 percent hydroxypropoxyl groups and 25 to 30 percent methoxyl groups and a ratio of O—H to C—H bonds of from 1.15 to 1.25. The hydroxyethyl methyl celluloses of the invention have the same O—H to C—H ratio as the described new hydroxypropyl compounds, namely, from 0.88 to 1.05. The O—H/C—H ratio is the ratio of the optical density of the ether to radiations of 2.9 microns wavelength to the optical density measured at 3.4 microns wavelength.

The new cellulose ethers are made by reaction between an alkali cellulose having an alkali (NaOH) to cellulose ratio, by weight, of from 0.7 to 1.5 and a water to cellulose ratio in about the same range, i. e., the alkali metal hydroxide solution used in making the alkali cellulose may be one of from 30 to 60 percent strength, but is preferably in the range from 45 to 55 percent strength, by weight. The alkali cellulose is mixed with from 0.45 to 0.8 part by weight of propylene oxide, or with the molecular equivalent amount of ethylene oxide (0.34 to 0.6 part by weight) per part of cellulose and the mixture is caused to react at a temperature not in excecss of 40° C., preferably from 30° to 40° C., until the olefine oxide is substantially all reacted. Thereafter, the product of this reaction is heated with from 1.1 to 2.0 parts by weight of methyl chloride, per part of cellulose, at a temperature of at least 40° C., preferably not above 80° C., until etherification is substantially complete. The etherifying agents may both be present at the start of the reaction, or the etherification may be effected at the lower temperature in the absence of methyl chloride, and the latter reagent may then be added when most of the olefine oxide has reacted. The resulting mixed ethers have the O—H/C—H ratios previously mentioned, between 0.88 and 1.05, and are soluble in water. Their water solutions have gel points of about 55° C., between those of water-soluble methyl cellulose (45° to 50° C.) and of the previously known non-thermoplastic, water-soluble hydroxypropyl methyl cellulose (above 60° C.) of lower hydroxypropoxyl content and O—H/C—H ratio of 1.15–1.25. In addition, the new products have considerable thermoplasticity, melting at least 10° and as much as 70° or more below their decomposition temperatures, when tested on a melting point bar.

The following examples illustrate the preparation of the new ethers, and show the thermoplastic properties of these and other water-soluble ethers of cellulose.

EXAMPLE 1

Cotton linters pulp was dipped in 50 percent aqueous NaOH and the excess wiped out to leave a ratio of NaOH/cellulose of 1.35 in the alkali cellulose. The alkali cellulose was then placed in a rotating pressure vessel and propylene oxide and methyl chloride added to give ratios of $$\frac{\text{Propylene oxide}}{\text{Cellulose}} = 0.5 \text{ and } \frac{\text{methyl chloride}}{\text{cellulose}} = 1.67$$

The reactor was heated at 40° C. for three hours, then the temperature was raised according to the following schedule: 2 hours at 45° C., 2 hours at 50° C., and 2 hours at 60° C. At the end of this period the reaction was substantially complete. The material was washed with hot water to remove impurities and dried.

A film of the product cast from water and dried gave on infrared absorption a ratio of percent absorption of (O—H/C—H) of 0.98. The product gave an excellent solution in propylene glycol when heated to 140° C. The viscosity of a 2 percent water solution at 25° C. was 68.4 cps.

EXAMPLE 2

Several solutions of different water-soluble cellulose ethers of comparable viscosity grades were prepared to compare their thermoplasticity. The solvent used was 50 percent aqueous methanol. The ether solutions were cast into films 0.003 inch thick and the softening, melting, and decomposition temperatures determined by placing small pieces of each film on a melting bar. The results are listed in Table 1.

*Table 1*

| Water-soluble cellulose ether | Softening Temp., ° C. | Melting Temp., ° C. | Decomposition Temp. |
|---|---|---|---|
| Thermoplastic methyl hydroxypropyl cellulose (O–H/C–H=0.98). | 255 | 259 | 293° C. |
| Non-thermoplastic methyl hydroxyethyl cellulose (O–H/C–H=1.43). | | | charred at 270° C. without melting. |
| Methyl cellulose (29.9% methoxyl). | 293 | | browned at 293° C. without melting. |
| Non-thermoplastic methyl hydroxypropyl cellulose (O–H/C–H=1.18). | 284 | 293 | 293° C. |
| Hydroxyethyl cellulose (31% hydroxyethoxyl). | | | charred at 250° C. without melting. |

As can be seen from the above table, the cellulose ethers useful in this invention soften and melt several degrees below the decomposition temperature. In contrast, the conventional water-soluble cellulose ethers available commercially do not melt below their decomposition temperatures. Thus, the ethers useful in this invention are those which exhibit sufficient thermoplasticity to be heat fabricated, whereas the more common cellulose ethers decompose before softening enough to be molded.

I claim:
1. The process which comprises subjecting an alkali cellulose initially having an alkali to cellulose ratio of from 0.7 to 1.5 and prepared by treating cellulose with a 30 to 60 percent aqueous alkali hydroxide solution to the action of an olefine oxide from the group consisting of ethylene oxide and propylene oxide, in amount molecularly equivalent to from 0.45 to 0.80 part by weight of propylene oxide per part of cellulose, at a temperature not in excess of 40° C. until the olefine oxide is substantially fully reacted, and to the action of from 1.1 to 2.0 parts of methyl chloride per part of cellulose at a temperature from 40° C. to 80° C. until the etherification is substantially complete, to produce a hydroxyalkyl methyl cellulose which is both cold water-soluble and thermoplastic.

2. The process claimed in claim 1, wherein both etherifying agents are present at the start of the etherification reaction.

3. The process claimed in claim 1, wherein the methyl chloride is not added until after the reaction with the olefine oxide is substantially complete.

4. The process claimed in claim 1, wherein the olefine oxide is ethylene oxide.

5. The process claimed in claim 1, wherein the olefine oxide is propylene oxide.

References Cited in the file of this patent

UNITED STATES PATENTS

| | | |
|---|---|---|
| 1,877,856 | Hagedorn et al. | Sept. 20, 1932 |
| 2,033,126 | Dreyfus | Mar. 10, 1936 |
| 2,388,764 | Reichel et al. | Nov. 13, 1945 |
| 2,526,683 | Murphy | Oct. 24, 1950 |
| 2,602,755 | Silvernail | July 8, 1952 |
| 2,610,180 | Klug | Sept. 9, 1952 |
| 2,629,667 | Kaveler | Feb. 24, 1953 |

OTHER REFERENCES

Heuser: Cellulose Chemistry (1947), page 545.